ELECTRONIC SPLICING CONTROL SYSTEM

Filed July 26, 1965 Sheet 1 of 2

INVENTOR.
MORRIS B. FINKELSTEIN
BY
Edward J. Norton
Attorney

INVENTOR.
MORRIS B. FINKELSTEIN
BY
Edward J. Norton
Attorney

United States Patent Office 3,441,666
Patented Apr. 29, 1969

3,441,666
ELECTRONIC SPLICING CONTROL SYSTEM
Morris B. Finkelstein, Collingswood, N.J., assignor to Radio Corporation of America, a corporation of Delaware
Filed July 26, 1965, Ser. No. 474,721
Int. Cl. H04n 5/78
U.S. Cl. 178—6.6 13 Claims

ABSTRACT OF THE DISCLOSURE

A technique is disclosed for establishing proper sequencing in electronically splicing a record medium for a particular spatial relation of the record head and erase head of a video tape recorder. Selected portions of video on the record medium are synchronously erased by a repetitive pulsed erase signal applied to an erase device while the recorder is in playack operation. A visual monitor is provided to allow observation of the signals representing the erased portion of the record medium, immediately following erasure, with respect to the unerased portion, thereby providing simultaneous observation of the erased and unerased portions. An operator controlled delay device is provided to establish the proper timing between the erased portions and synchronizing signals present in the video recorded on the record medium.

This invention relates to tape recording systems and particularly to improvements in splicing systems for magnetic video tape recording devices.

Electronic splicing of video tape accomplishes the replacement of previously recorded video with new video or the addition of new video to a previously recorded program without physically cutting or joining pieces of tape. For this and other reasons electronic splicing is very useful in video programming. It is therefore important that splicing be accomplished accurately and with as little difficulty as possible. Electronic splicing techniques which are known to the prior art often require time consuming procedures to set up a video tape machine before the splicing procedure can be performed. For example, where a video tape program is to be spliced on a tape machine in which a part such as the headwheel assembly has been replaced, a number of test splices have to be performed to properly set up the splicing machine. The operator sets up the splicing machine by either a "cut-and-try" technique or by chemically "developing" the tape to visually display the magnetic record so that the splicing machine may be adjusted according to the visually observed effect of the splicing process on the tape.

It is an object of the present invention to provide a novel apparatus for setting up a tape machine for splicing.

It is a further object of the present invention to provide an electronic system for properly setting up a video tape machine for electronic splicing.

It is a further object of the present invention to provide an electronic system for permitting visual observation of the effect of an erasure on a magnetic tape.

It is a further object of the present invention to provide an electronic system for permitting visual observation of the effect of an erasure on a magnetic video tape.

These and other objects are accomplished according to the present invention by an "erase-test" procedure prior to actual splicing. A portion of a tape is recorded and played back on the video tape machine which is to perform the splicing. The operator places the machine in the erase-test mode during the playback. Erase-test circuitry constructed according to the present invention periodically pulses the erase head of the machine to erase small portions of the video recording. A monitor is provided for displaying the effect of the pulsed erasures. In one embodiment, the monitor is an oscilloscope displaying the FM signal read from the video heads. In another embodiment a picture monitor may be used to observe the effect of the erasure. By observing the effect of the pulsed erasures the operator can easily adjust the splicing circuitry to accurately set up the machine for splicing.

A more detailed description of certain embodiments of the invention will now be given with reference to the accompanying drawing in which:

FIG. 1 is a pictorial representation of a portion of a video tape.

FIG. 1, *a–b* are enlarged pictorial views of the circled areas of the video tape, indicated in FIGURE 1.

Figures 1, 1A, 1B:
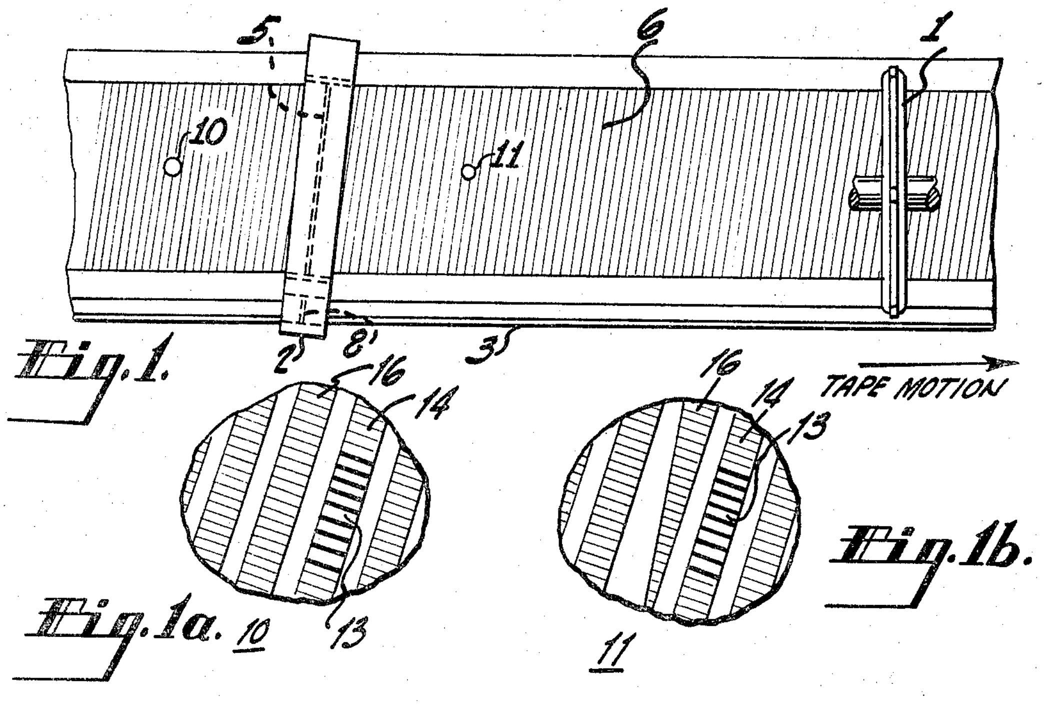

FIGURE 1 is a pictorial representation of a portion of a quadruplex recording system including a conventional quadruplex recording head wheel 1 and an erase head 2. A magnetic tape 3 passes from left to right beneath both the erase head 2 and the head wheel 1. The erase head 2 has a first erase gap 5 constructed to erase the transverse video recordings 6 on the tape 3 and a second erase gap 8 for erasing the control track recorded on the tape. The erase gap 5 is approximately parallel to the tape's transverse video tracks corresponding to the slowest operating speed of the tape recorder. (Tape machines usually operate at either the standard speed of 15 inches per second or at half speed, i.e. 7.5 inches per second.) The erase gap 5 is not parallel to the record tracks 6 because these tracks 6 illustrate tracks recorded at 15 inches per second. The degree of inclination of the erase head 2 is exaggerated in FIG. 1 as is the angle of the video record tracks 6. The distance between the heads on the head wheel 1 and the erase gap 5 along the middle of the tape is slightly less than seven and one half inches which corresponds to approximately fifteen frames of video information recorded at fifteen inches per second.

The two enlarged views of the sections 10 and 11 in FIGURES 1*a* and 1*b* respectively, illustrate the transverse video recordings before and after passing under the erase head 2. The two views show the record tracks 14 which include synchronization signals 13. The circuitry of the video tape machine generates frame pulses from the synchronization signals. A frame pulse indicates that the video read from the tape just after the frame pulse is the beginning of a new video frame. Note that the track 16 in view 11 differs from the same track in view 10. The difference is due to the pulsed erasure of the erase test as will be explained below.

During the splicing process the operator first places the tape machine in the playback mode of operation, the rotating head wheel 1 reads the video signals previously recorded on the magnetic tape 3 and plays them back through a suitable video monitor. When the operator of the machine wishes to replace previously recorded information with new video, he places the machine in a record mode of operation and the erase head 2 becomes operative after a short delay. Certain restrictions are placed on the operation of the erase head 2 in going into a splice. The erase head 2, for example, should not begin erasing until just after the frame pulse of the first frame to be erased appears under the erase head. If erasure begins before this time, then the end result, after the new video is inserted, will be a blank space, i.e. a lack of video, between the point where the erasure was started and the frame pulse. Thus, the splicing system must be able to predict the presence of a frame pulse under the erase head 2 in order to begin erasure at that time or slightly thereafter.

The presence of a frame pulse under the erase head 2 is detected in the present invention by utilizing frame pulses generated by the tape machine. During the recording process, each new frame of video information recorded is preceded by a frame pulse. During the playback process the reproducing machine continuously detects frame pulses, as well as other synchronization information, to control the operation of the reproducing machine. The reproducing machine generates reference frame pulses, and synchronization circuitry ensures that the tape frame pulses occur at the same time as the reference frame pulses. By observing the reference frame pulses generated by the machine it can be determined precisely when a frame pulse appears at a pick up head on the head wheel 1. If the distance between the head wheel 1 and the erase head 2 is known precisely, then it can easily be determined when a frame pulse will appear under the erase head 2 if the tape velocity is known "precisely." For example, if the distance between the head wheel 1 and the erase head 2 is exactly 7.5 inches then, because each recorded frame takes up one half inch on the tape at a tape velocity of 15.000 in./sec. and a frame rate of 30 pulses per second, a frame pulse will appear under the erase head 2 at exactly the same time as a frame pulse appears at the head wheel 1. If the erasing head is placed at slightly less than 7.5 inches from the head wheel 1, which is purposely done in this case, then, a frame pulse will not appear under the erase head 2 at precisely the same time as a frame pulse appears at the head wheel 1. It can be determined when a frame pulse will appear under the erase head 2 and the erase signal can be delayed the required interval after a frame pulse appears under the head wheel 1. The erase head 2 is energized just after the frame pulse appears under the erase head 2. The erase procedure continues until all the undesired video has been erased.

The new video signal is supplied to the record heads on the head wheel 1 when the first part of the tape's erased portion reaches the head wheel 1. After the desired information has been inserted, the machine is taken out of the record mode and the erase signal is removed from the erase head 2. Certain restrictions are placed on the operation of the erase head in coming out of a splice. Ideally, the erase signal should stop just after a frame pulse appears under the erase head 2; but even more important, the erase head 2 should erase no video after the last newly recorded frame. For this reason the erase signal is usually stopped just before the frame pulse appears under the erase head 2 and the last part of the new video is recorded over the small amount of old video left by the erase head.

While an exact relationship can be established between a head wheel and an erase head on a video tape machine it is nevertheless desirable to have some degree of flexibility in the relationship in order to provide ease in replacing parts. For example, head wheel assemblies are frequently changed on video tape machines and it would be rather difficult to establish an exact dimension between the new head wheel and the erase head every time a new head wheel assembly was inserted into the machine. These differences have in the past made it difficult to set-up a machine for splicing tape from another machine or after a new head wheel panel has been inserted.

The present invention provides a relatively simple procedure for establishing the proper operative relationship between a video tape and an erase head on a video tape machine. The system of the present invention provides an "erase-test" for setting up the splicing machine. Before the actual splicing begins, the erase head 2 is periodically pulsed and the effect of the periodic pulsing is visually observed on a suitable monitoring device, for example a cathode ray oscilloscope showing the FM signal picked up by the reproducing heads. A monitor showing the picture may also be used either alone or in combination with the FM video monitor. By observing the effect of the erase test pulses the operator of the tape machine can accurately determine the proper delay which should be introduced between the appearance of a frame pulse under the head wheel 1 and the beginning of the erase signal.

Figure 2:
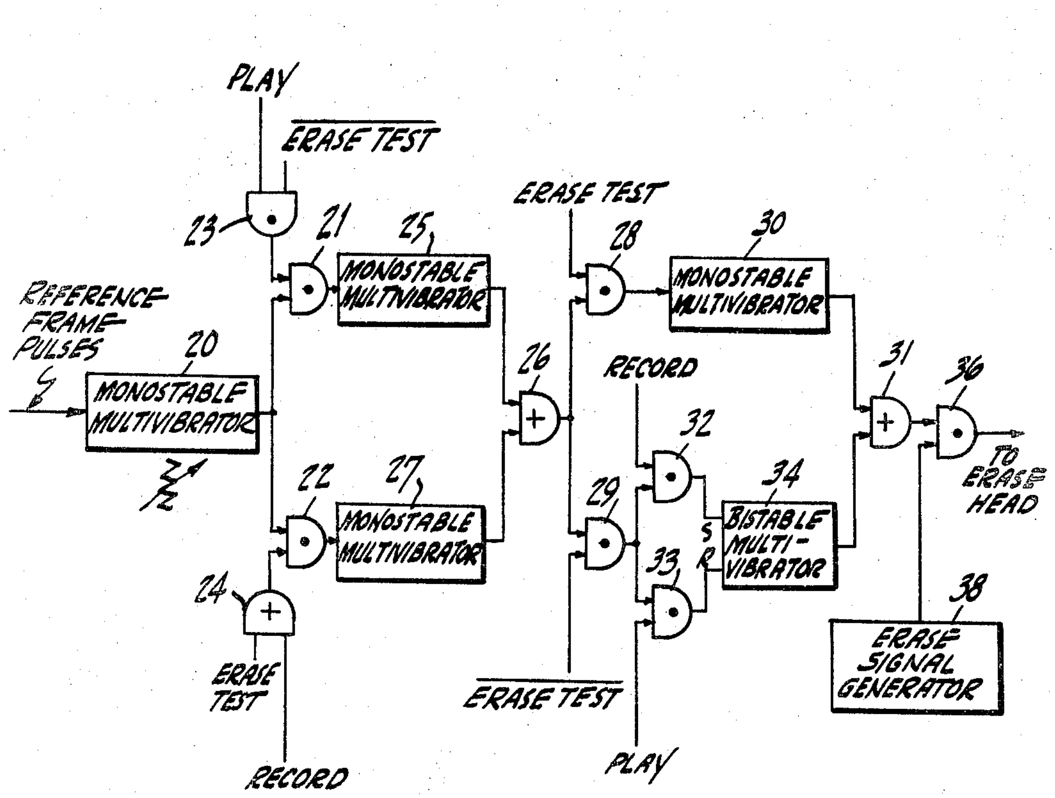
FIG. 2 is a block diagram of one embodiment of the present invention.

FIGURE 2 is a logic diagram of one embodiment of an erase test circuit constructed according to the present invention. Reference frame pulses from the synchronization system of the tape machine are supplied to a monostable multivibrator 20 the delay of which is variable by the operator of the tape machine. The output of the multivibrator 20 forms an input to two AND gates 21 and 22, the first of which 21 receives the output of an AND gate 23 which has two inputs the first a playback signal, PLAY, which is a binary ONE when the machine is playing back video or when the splicing system is coming out of a splice and a second signal, an inverted erase test signal, $\overline{\text{ERASE TEST}}$. The erase test signal ERASE TEST is a binary ONE when an erase test is being made and a binary ZERO at all other times. The second AND gate 22 receives a signal from the output of an OR gate 24 which has two inputs, RECORD, which is a binary ONE when the machine is recording, and ERASE TEST. The output of the first AND gate 21 is supplied to a monostable multivibrator 25 the output of which is supplied to an OR gate 26. The output of the AND gate 22 forms the input to another monostable multivibrator 27 the output of which is also connected to the OR gate 26. The two different monostable multivibrators 25 and 27 are included to provide slightly different delays for the two cases of going into a splice and coming out of a splice. The delay afforded by the multivibrator 25 is less than that of the multivibrator 27. The output of the OR gate 26 is supplied to two AND gates 28 and 29 the first of which 28 receives ERASE TEST and the second of which 29 receives $\overline{\text{ERASE TEST}}$. The output of the AND gate 28 is supplied to the input of a monostable multivibrator 30 the output of which is connected to an OR gate 31. The output of the AND gate 29 forms one input to a pair of AND gates 32 and 33. The first AND gate 32 receives the RECORD signal as a second input while the second AND gate 33 receives the PLAY signal as its second input. The output of the first AND gate 32 is connected to the set input, S, of a set-reset type bistable multivibrator 34. When the signal at the set input is a binary ONE the output of the multivibrator goes to the ONE state and remains there until a binary ONE is applied to the reset input, R. The reset input R, of the multivibrator 34 is connected to the output of the AND gate 33. The output of the multivibrator 34 is connected to the second input of the OR gate 31. The output of the OR gate 31 is connected to an AND gate 36 which also receives a signal from the erase signal generator 38 which generates the signal which is supplied to the erase head of the video tape machine.

When a part such as the head wheel assembly has been replaced, an erase test is made before splicing. A tape is recorded on the splicing machine and the machine is set up for a test splice using the recorded tape. The operator places the machine in the erase test mode of operation. The ERASE TEST signal, applied to the AND gate 28 and the OR gate 24 is a binary ONE. Reference frame pulses from the synchronization circuitry of the video machine arrive at the monostable multivibrator 20 and are delayed before reaching the AND gate 22. The delay is adjustable by the operator. The pulses pass through the AND gate 22, since that gate is turned on by the ERASE TEST signal, and trigger the monostable multivibrator 27 which inserts an additional delay. The output pulses from the multivibrator 27 pass through the OR gate 26 and through the AND gate 28 to arrive at the monostable multivibrator 30 which generates short erase test pulses which can be by way of example approximately 200 microseconds in duration. The erase test pulses pass through the OR gate 31 to the AND gate 36 to periodically supply the erase test signal from the generator 38 to the erase head. No pulses pass through the AND gate 28 since the inverted erase test signal $\overline{\text{ERASE TEST}}$ is a ZERO.

If reference is now made to the enlarged sections 10 and 11 of FIGURES 1*a* and 1*b* the effect of one erase pulse can be seen. The enlarged view 10 shows a section of the tape containing one band of video 14 containing a frame pulse within the vertical synchronization information 13. A similar band is shown in the enlarged view 11. In view 11 the video tracks have passed under the erase head 2. Note that in the enlarged view 11 the band 16, which appears immediately after, i.e. to the left of, the band 14, is more or less triangularly shaped due to a portion of that band having been erased by the erase-test pulse. The triangular shape is due to the non-parallel alignment between the erase gap 5 and the track 16. (Recall that the erase head 2 is aligned approximately parallel to the tracks recorded at 7.5 inches per second, and not parallel to tracks recorded at 15 inches per second.)

Figure 3:
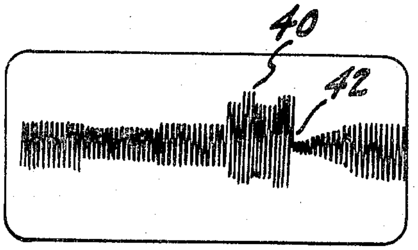
FIGS. 3 and 4 are representative of cathode ray oscilloscope displays.

FIG. 3 illustrates a cathode ray oscilloscope displaying an FM signal read from the video tape by the pick up heads on the head wheel 1. FIGURE 3 illustrates six bands of video, i.e. six transverse passe of the recording heads, where the tape speed is 15 inches per second. The fourth band 40 is sharply distinguished from the other bands because it contains vertical synchronization information and a frame pulse signal. Each thirty-second band of FM includes synchronization information containing a frame pulse. One skilled in the art can, by observing the FM monitor, pick out the band containing the frame pulse relatively easily. The fifth band 42 of FM in FIG. 3 corresponds to band 16 in view 11 and, unlike the other bands, is somewhat triangularly shaped. The triangular shape is due to the triangular shape of band 16.

The triangularly shaped band 42 can be made to appear in any portion of the trace shown in FIG. 3, i.e. it can be moved either left or right, by adjusting the delay of the unit 20, FIG. 2. Thus, in order to set up a machine for splicing the operator observes the monitor and adjusts the delay 20 to place the triangularly shaped band 42 at the desired position, here immediately after the frame pulse band 40 as illustrated in FIG. 3.

Figure 4:
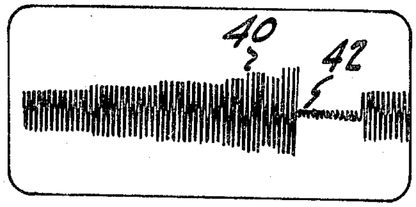

If the video information is recorded at half speed, i.e. 7.5 inches per second, then the erase head 2 is approximately parallel to the video track and during the erase test mode the erase pulse can erase one entire track of video rather than form the triangular shaped portion as above. FIG. 4 illustrates the FM signal read from the tape in this case. The erased band 42 is again placed immediately after the band 40 containing the frame pulse.

The erase portion in either of the above cases illustrated by FIGS. 3 and 4 can be placed at any other portion of tape. For example, it can be placed within a guard band.

With the monostable circuit 20 adjusted to place the erased band 42 in the desired position, the delay is properly adjusted and the operator can begin the splicing operation. When going into a splice the RECORD signal becomes a ONE and the ERASE TEST signal, is a binary ZERO. Thus, pulses from the monostable circuit 20 continue to pass through the AND gate 22 to the monostable circuit 27 since the output of the OR gate 24 is a binary ONE. The monostable multivibrator 30 is in effect taken out of operation, since no pulses from the OR gate 26 get through the AND gate 28. Rather, pulses from the OR gate 26 pass through the AND gate 29 and through the AND gate 32 to the set input, S, of the bistable multivibrator 34. The first pulse from the OR gate 26 sets the bistable multivibrator 34 and its output goes to ONE. The ONE output passes through the OR gate 31 to the AND gate 36. Thus, a continuous erase signal is supplied to the erase heads from the generator 38.

After the desired video has been inserted, the operator takes the machine out of the splice by placing the machine in the PLAY mode of operation. In this mode the PLAY signal is a ONE at the two AND gates 23 and 33 while the RECORD signal is a ZERO at the AND gate 32 and at the OR gate 24. The ERASE TEST signal at the OR gate 41 is also a ZERO and the inverted signal, $\overline{\text{ERASE TEST}}$ at the AND gate 23 is a ONE. Pulses from the monostable multivibrator 20 arrive at the monostable circuit 25 through the AND gate 21, but do not arrive at the monostable circuit 27. Also, the next pulse from the OR gate 26 is directed through the AND gates 29 and 33 to reset the bistable multivibrator 34 thus ending the erase signal.

The monostable multivibrator 25 provides a shorter delay than the multivibrator 27 to ensure that the erase signal will end just prior to a frame pulse reaching the erase head rather than just after as in the case of going into a splice.

To briefly summarize the operation, the machine is set up for splicing by the operator performing an erase test. The splicing circuitry (FIG. 2) generates short erase test pulses which erase portions of the video recorded on the tape. The operator observes the position of the erased portions of the tape on a monitor (FIG. 3) and adjusts the delay unit 20 in the splicing circuitry to place the erased portion at the desired position. With the delay properly adjusted, the desired splicing can be performed.

What is claimed is:

1. In a tape machine including means for erasing information recorded on a tape, the combination of,
- (a) means for periodically energizing said erasing means, and
- (b) means for displaying said information after said periodic erasure.

2. In a tape machine including an electronic splicing system which includes means for erasing, inserting, and adding information to a previously recorded tape, the combination of,
- (a) means for periodically energizing the erasing means of said splicing system, and
- (b) means for displaying said previously recorded information after said periodic erasure.

3. In a video tape machine including means for erasing previously recorded video information containing synchronization signals the combination of,
- (a) an adjustable delay device,
- (b) means responsive to said synchronization signals for periodically supplying an energizing signal to said erasing means through said adjustable delay, and
- (c) means for displaying said information after said periodic erasure.

4. In a video tape machine including means for erasing previously recorded video information containing synchronization signals the combination of,
- (a) an adjustable delay device,
- (b) means responsive to said synchronization signals for periodically supplying pulses of energizing current to said erasing means through said adjustable delay, and
- (c) means for displaying said information after said periodic erasure.

5. In a video tape machine including means for erasing previously recorded video information containing synchronization signals the combination of,
- (a) an adjustable delay device,
- (b) means for supplying an energizing signal to said erasing means through said delay,
- (c) means for periodically energizing said last mentioned means to periodically energize said erasing means, and
- (d) means for displaying said information after said periodic erasure.

6. In a video tape machine including means for erasing previously recorded video information containing synchronization signals the combination of, (a) an adjustable delay device,
(b) means for supplying an energizing signal to said erasing means through said delay,
(c) means for periodically pulsing said second mentioned means to an operative condition whereby said second mentioned means supplies pulses of energizing signals to said erasing means, and
(d) means for displaying said information after it has passed said erasing means.

7. In a video tape machine of the quadruplex type including an electronic splicing system including means for erasing, inserting, and adding new video information to a previously recorded tape the combination of,
(a) means for periodically energizing the erasing means of said splicing system,
(b) means for adjusting the time when said periodic erasure occurs, and
(c) means for displaying the effect of said erasure on said video information.

8. In a video tape machine of the quadruplex type including an electronic editing system including means for erasing, inserting, and adding video information containing frame pulses to a previously recorded tape, the combination of,
(a) means responsive to said frame pulses for supplying pulses of energizing current to said erasing means, each of said pulses occurring after said frame pulse occur,
(b) means for adjusting the interval between said frame pulses and said energizing pulses, and
(c) means for displaying said video information after said erasure.

9. In a tape machine including means for reading information from a tape and means for erasing information recorded on a tape said information containing synchronization signals and said erasing means being located upstream of said reading means the combination of,
(a) means responsive to said synchronization signals read by said reading means for generating first pulses after predetermined parts of said synchronization signals are read by said reading means,
(b) means for adjusting the time interval between pulses generated by said first mentioned means and said parts of said synchronization signals,
(c) means for generating control signals,
(d) means responsive to said pulses generated by said first mentioned means and to said control signals for supplying pulses of energizing current to said erasing means upon the occurrence of pulses from said first mentioned means when said control signals indicate a first condition, and
(e) means responsive to said pulses generated by said first mentioned means and to said control signals for supplying a continuous energizing current to said erasing means upon the occurrence of a pulse from said first mentioned means and when said control signals indicate a second condition.

10. In a video tape machine of the quadruplex type including a head wheel for supporting recording and reproducing heads and an erase head for erasing transverse tracks of video recorded on a magnetic tape, said video containing synchronization signals, and said erase head being located upstream of said head wheel, the combination of,
(a) means responsive to said synchronization signals read by said reproducing heads for generating first pulses after predetermined parts of said synchronization signals are read by said reproducing heads,
(b) means for adjusting the time interval between pulses generated by said first mentioned means and said parts of said synchronization signals,
(c) means for generating control signals,
(d) means responsive to said pulses generated by said first mentioned means and to said control signals for supplying pulses of energizing current to said erase head upon the occurrence of pulses from said first mentioned means when said control signals indicate a first condition, and
(e) means responsive to said pulses generated by said first mentioned means and to said control signals for supplying a continuous energizing current to said erase head upon the occurrence of a pulse from said first mentioned means and when said control signals indicate a second condition.

11. In a video tape machine of the quadruplex type including a head wheel for supporting recording and reproducing heads and an erase head having an erase gap for erasing transverse tracks of video recorded on a magnetic tape said video containing frame pulses and said erase head being located upstream of said head wheel the combination of,
(a) means responsive to said frame pulses read by said reproducing heads for generating first pulses after said frame pulses are read by said reproducing heads,
(b) means for adjusting the time interval between pulses generated by said first mentioned means and said frame pulses,
(c) means for generating control signals,
(d) means responsive to said pulses generated by said first mentioned means and to said control signals for supplying pulses of energizing current to said erase head upon the occurrence of pulses from said first mentioned means when said control signals indicate a first condition, and
(e) means responsive to said pulses generated by said first mentioned means and to said control signals for supplying a continuous energizing current to said erase head upon the occurrence of a pulse from said first mentioned means and when said control signals indicate a second condition.

12. The combination as claimed in claim 11 wherein said erase gap of said erase head is parallel to said transverse tracks of video.

13. The combination as claimed in claim 11 wherein said erase gap of said erase head is positioned non-parallel to said transverse tracks of video.

References Cited

UNITED STATES PATENTS 3,265,818 8/1966 Goossen.
3,342,932 9/1967 Bounsall.
3,342,949 9/1967 Wessells.

ROBERT L. GRIFFIN, *Primary Examiner.*

HOWARD W. BRITTON, *Assistant Examiner.*

U.S. Cl. X.R.

179—100.2